US009260009B2

(12) United States Patent
Mizuno et al.

(10) Patent No.: US 9,260,009 B2
(45) Date of Patent: Feb. 16, 2016

(54) VEHICLE AND METHOD OF MOUNTING GAS FUEL TANK

(75) Inventors: Hideaki Mizuno, Owariasahi (JP); Yoshiaki Naganuma, Nissin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 929 days.

(21) Appl. No.: 11/794,095

(22) PCT Filed: Jan. 6, 2006

(86) PCT No.: PCT/JP2006/300108
§ 371 (c)(1), (2), (4) Date: Jun. 25, 2007

(87) PCT Pub. No.: WO2006/073193
PCT Pub. Date: Jul. 13, 2006

(65) Prior Publication Data
US 2008/0156809 A1    Jul. 3, 2008

(30) Foreign Application Priority Data
Jan. 7, 2005    (JP) ................................. 2005-002273

(51) Int. Cl.
B60K 11/04    (2006.01)
B60K 15/035    (2006.01)
(Continued)

(52) U.S. Cl.
CPC ........... B60K 15/07 (2013.01); *B60Y 2200/143* (2013.01)

(58) Field of Classification Search
CPC .... B60K 11/04; B60K 15/067; B60K 15/035; B60K 2015/035; B60H 1/32; B60H 1/24; B60H 1/26; B65D 51/16; B65D 88/12

USPC .......... 220/562, 4.14, 1.5, 1.6; 180/314, 69.2; 160/104; 454/136
See application file for complete search history.

(56) References Cited

U.S. PATENT DOCUMENTS 3,213,821 A * 10/1965 Godwin .................. 114/344
3,430,647 A *  3/1969 Suchowolec .............. 137/377
(Continued)

FOREIGN PATENT DOCUMENTS

DE    39 12 623 A1    10/1990
DE    195 18 036 C1    12/1996
(Continued)

OTHER PUBLICATIONS

Office Action mailed Dec. 13, 2013, in German Patent Application No. 11 2006 000 144.2 and English translation.
(Continued)

*Primary Examiner* — Fenn Mathew
*Assistant Examiner* — Andrew T Kirsch
(74) *Attorney, Agent, or Firm* — Kenyon & Kenyon LLP

(57) ABSTRACT

A hydrogen tank is mounted on a roof so that a valve unit mounted to one end in a longitudinal direction of the hydrogen tank is separated as far apart as possible from a front platform and a middle platform of a fuel cell equipped bus and so that the longitudinal direction of the hydrogen tank is in a lateral direction of a vehicle. Thus, even if hydrogen leaks from the valve unit or a fusible plug valve of the valve unit is fused to discharge hydrogen from the tank, the influence of the leaking or discharged hydrogen on the front platform and the middle platform can be reduced.

8 Claims, 4 Drawing Sheets

(51) Int. Cl.
    *B60K 15/063*   (2006.01)
    *B60K 15/067*   (2006.01)
    *B60H 1/32*     (2006.01)
    *B60H 1/24*     (2006.01)
    *B60H 1/26*     (2006.01)
    *B65D 51/16*    (2006.01)
    *B65D 88/12*    (2006.01)
    *B60P 3/00*     (2006.01)
    *B60K 15/07*    (2006.01)

(56) References Cited

U.S. PATENT DOCUMENTS

| | | | | |
|---|---|---|---|---|
| 5,309,972 | A * | 5/1994 | Thomas | 160/90 |
| 6,367,573 | B1 * | 4/2002 | Scott | 180/314 |
| 2004/0026427 | A1 * | 2/2004 | Shigematsu | 220/562 |

FOREIGN PATENT DOCUMENTS

| | | |
|---|---|---|
| DE | 600 06 898 T2 | 10/2004 |
| JP | 11-245672 A | 9/1999 |
| JP | 2000-127860 A | 5/2000 |
| JP | 2000-170606 A | 6/2000 |
| JP | 2000-225855 | 8/2000 |
| JP | 2001-239845 A | 9/2001 |

OTHER PUBLICATIONS

A. Berti, Der neue MAN Brennstoffzellenbus, <http://www.brennstoffzellenbus.de/bus2004/bsz04-1d.htm>, May 2004, and partial English translation.

Netinform.net, Hydrogen and Fuel Cells, Toyota Hino FCHV-Bus 2 (2002), <http://www.netinform.net/h2/h2Mobility/-Default.aspx>, Accessed Dec. 25, 2013.

R. Wurster et al., "Fuel Cell Propulsion for Urban Duty Vehicles—Bavarian Fuel Cell Bus Project," 12th World Hydrogen Energy Conference, Buenos Aires, Argentina, Jun. 1998, pp. 1-8 <www.netinform.de/H2/files/pdf/-Bavarian_Fuel_Cell_Bus_Project.pdf>.

M. Schuckert, "The CUTE hydrogen fuel cell bus demonstration project—an update," CUTE, Jun. 17, 2003, <ftp://ftp.cordis.europa.eu/pub/sustdev/docs/energy/sustdev_h2_sessionb_schuckert.pdf/>.

* cited by examiner

VEHICLE AND METHOD OF MOUNTING GAS FUEL TANK

This is a 371 national phase application of PCT/JP2006/300108 filed 6 Jan. 2006, which claims priority to Japanese Patent Application No. 2005-002273 filed 7 Jan. 2005, the contents of which are incorporated herein by reference.

TECHNICAL FIELD

The present invention relates to a vehicle and a method of mounting a gas fuel tank, and more particularly to a vehicle to which at least one gas fuel tank that stores gas fuel is mounted, and a method of mounting at least one gas fuel tank that stores gas fuel to a vehicle.

BACKGROUND ART

As a conventional vehicle of this type, a bus is proposed in which a plurality of gas fuel tanks each having a valve body mounted to a port opening at a front end in a longitudinal direction and store compression natural gas are mounted on a roof of a vehicle so that the longitudinal direction of the gas fuel tanks is in a vehicle fore/aft direction (for example, see Patent Document 1). In this vehicle, the longitudinal direction of the gas fuel tank is in the vehicle fore/aft direction, and thus a gas fuel tank longer than a vehicle width can be used.
[Patent Document 1] Japanese Patent Laid-Open No. 2001-239845

DISCLOSURE OF THE INVENTION

However, in the above described vehicle, a platform is often provided in a side surface of the vehicle, and thus the port opening of the gas fuel tank is sometimes placed relatively near the platform. In this case, when gas fuel is discharged outside from the gas fuel tank, the influence of the discharged gas fuel on the platform is sometimes insufficiently reduced. A supposed case where gas fuel is discharged outside from the gas fuel tank is the case where an abnormality of the valve body causes leakage of gas fuel or the case where the valve body is opened with abnormal pressure in the tank.

A vehicle and a method of mounting a gas fuel tank according to the present invention has one object to reduce the influence, on a platform, of gas fuel discharged outside from a gas fuel tank. Also, the vehicle and the method of mounting a gas fuel tank according to the present invention has an object to dilute the gas fuel discharged outside from the gas fuel tank.

In order to achieve at least part of the above described objects, the vehicle and the method of mounting a gas fuel tank according to the present invention adopts means described below.

The present invention is directed to a vehicle to which at least one gas fuel tank that stores gas fuel is mounted, and the gas fuel tank is mounted so that a longitudinal direction thereof is in a lateral direction of the vehicle and so that a valve structure mounted to the gas fuel tank as a port opening for gas fuel of the gas fuel tank is separated from a platform of an occupant compartment of the vehicle.

In the vehicle of the present invention, the gas fuel tank is mounted so that the longitudinal direction thereof is in the lateral direction of the vehicle and so that the valve structure mounted to the port opening for the gas fuel of the gas fuel tank is separated from the platform of the occupant compartment, thereby reducing the influence, on the platform, of the gas fuel discharged outside from the valve structure mounted to the gas fuel tank. The vehicle may include an automobile such as a compact car, a large car, or a bus, or a train.

In one preferable embodiment of the vehicle of the invention, the gas fuel tank is mounted so that the platform and the valve structure are placed on one side and the other side, respectively, in the lateral direction of the vehicle. Since the platform is generally provided on one of lateral sides of the vehicle that does not pass an oncoming car, placing the valve structure at the port opening of the gas fuel tank on the side that passes an oncoming vehicle increases the influence of running air by the oncoming vehicle near the valve structure. This can facilitate dilution of gas fuel discharged outside via the valve structure, and reduce the influence of the discharged gas fuel on the platform.

In another preferable embodiment of the vehicle of the invention, the gas fuel tank is mounted so that the valve structure is separated from the platform by a substantial vehicle width or more. This can reduce the influence, on the platform, of gas fuel discharged outside through the port opening for the gas fuel of the gas fuel tank.

In the vehicle of the present invention, the gas fuel tank may be mounted on a roof of the vehicle. Thus, the gas fuel tank can be easily mounted so that the longitudinal direction thereof is in the lateral direction of the vehicle. In this case, a cover may be provided that covers the gas fuel tank from above and has a ventilating opening for ventilation. Further, in this case, the ventilating opening may be designed so as to reduce pressure inside the cover when the pressure inside the cover is suddenly increased.

In still another preferable embodiment of the vehicle of the invention, a gas fuel tank having the valve structure mounted near a front end at one end in the longitudinal direction is mounted to the vehicle. This can separate the valve structure farther apart from the platform.

In the vehicle of the present invention, the valve structure may include a safety valve that discharges gas fuel substantially perpendicularly to the longitudinal direction of the gas fuel tank, and the gas fuel tank may be mounted to the vehicle so that a discharge direction of the gas fuel from the safety valve is directed downward from a horizontal position. In this case, the gas fuel tank may be mounted to the vehicle so that the gas fuel discharged from the safety valve is diffused by a vehicle body. This can increase diffusion of gas fuel discharged from the safety valve and dilute the gas fuel. Further, in this case, the gas fuel tank may be mounted on a roof of the vehicle, and the vehicle may include a cover that covers the gas fuel tank from above and has a ventilating opening for ventilation.

The present invention is directed to the method of mounting a gas fuel tank, the method mounting at least one gas fuel tank that stores gas fuel on the vehicle, and the gas fuel tank is mounted so that a longitudinal direction thereof is in a lateral direction of the vehicle and so that a valve structure mounted to the gas fuel tank as a port opening for gas fuel of the gas fuel tank is separated from a platform of an occupant compartment of the vehicle.

According to the method of mounting a gas fuel tank of the present invention, the gas fuel tank is mounted so that the longitudinal direction thereof is in the lateral direction of the vehicle and so that the valve structure mounted to the port opening for the gas fuel of the gas fuel tank is separated from the platform of the occupant compartment of the vehicle. This can reduce the influence, on the platform, of gas fuel discharged outside from the valve structure mounted to the gas fuel tank.

In one preferable embodiment of the method of mounting a gas fuel tank of the invention, the gas fuel tank is mounted on a roof of the vehicle, and the gas fuel tank is covered with a cover having a ventilating opening for ventilation.

BEST MODE FOR CARRYING OUT THE INVENTION

Now, the best mode for carrying out the invention will be described with reference to an embodiment.

Figure 1:
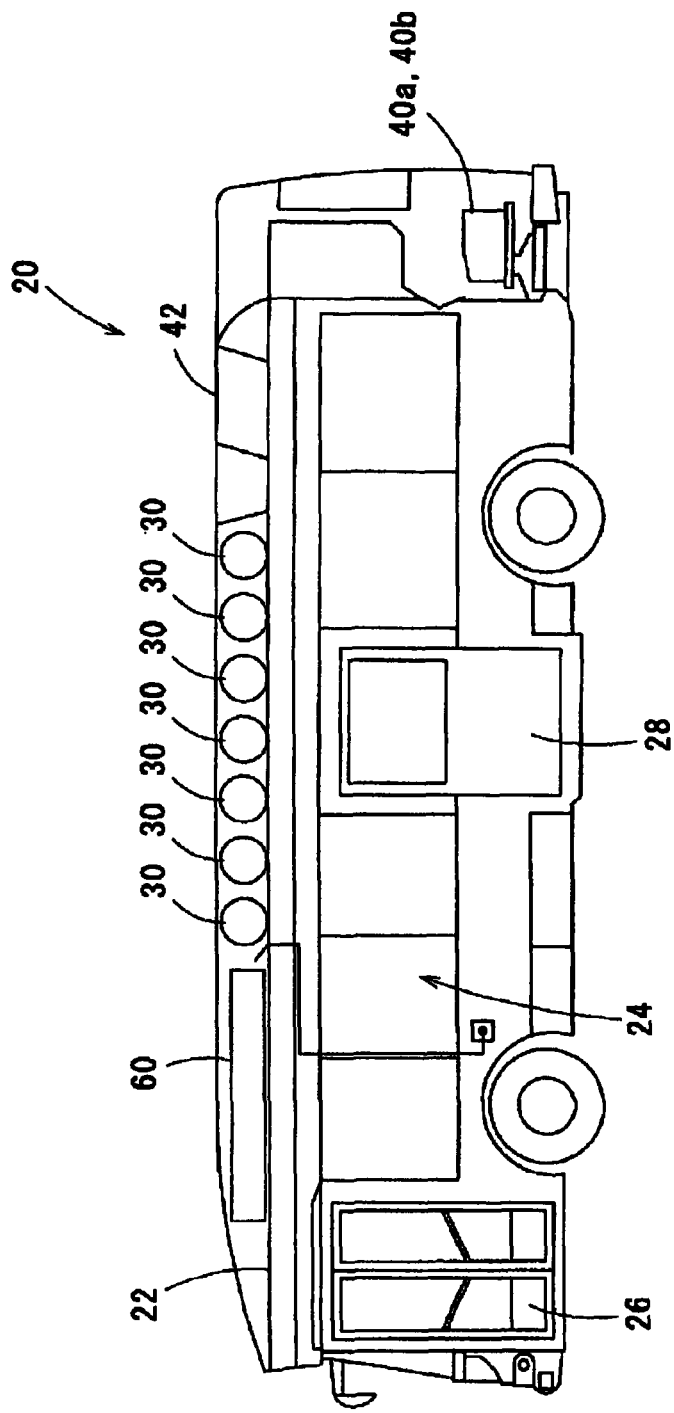
FIG. 1 is a schematic block diagram of a configuration of a fuel cell equipped bus 20 according to an embodiment of the present invention.
Figure 2:
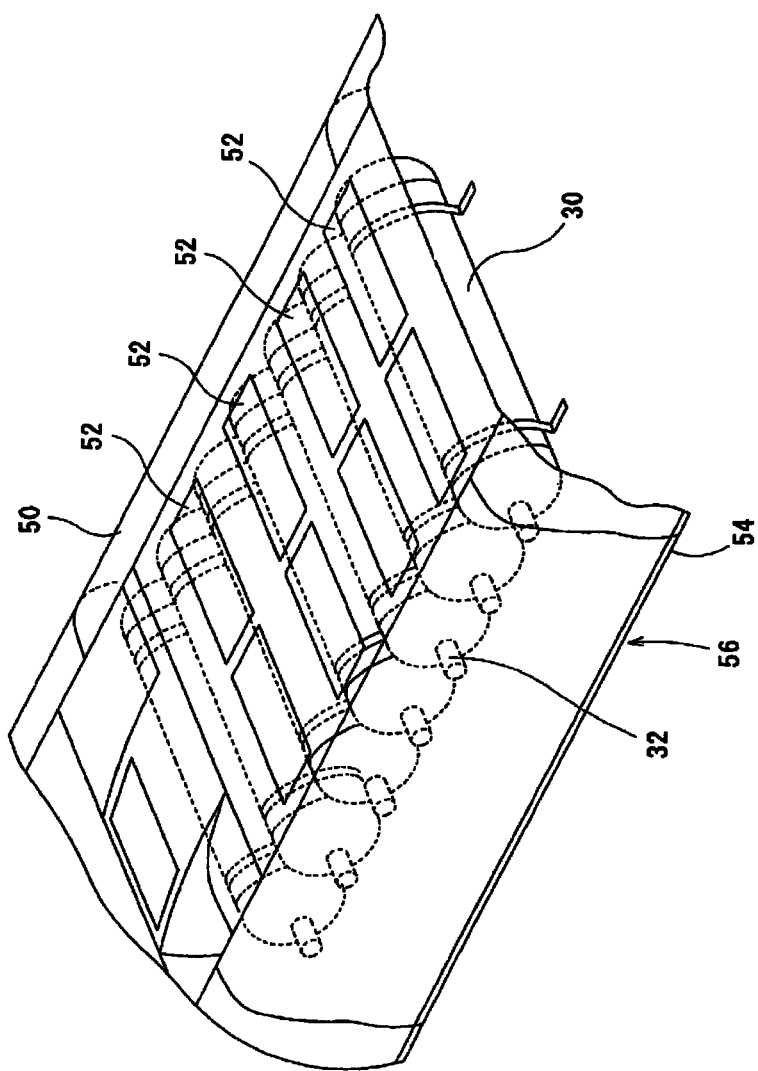
FIG. 2 illustrates a state in which a hydrogen tank 30 is mounted on a roof 22 of the fuel cell equipped bus 20 of the embodiment.
Figure 3:
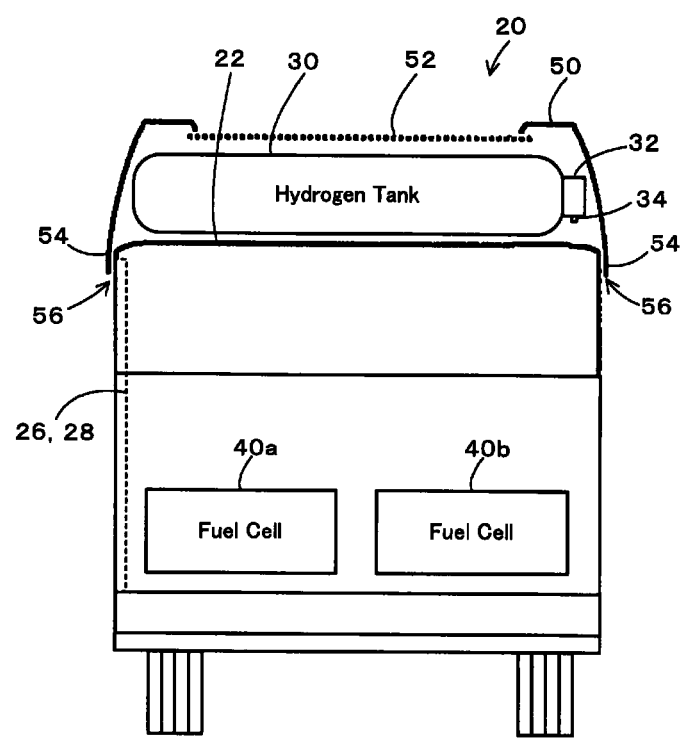
FIG. 3 illustrates a state in which fuel cells 40a and 40b and the hydrogen tank 30 are mounted in a rear portion and on the roof 22, respectively, of the fuel cell equipped bus 20.
Figure 4:
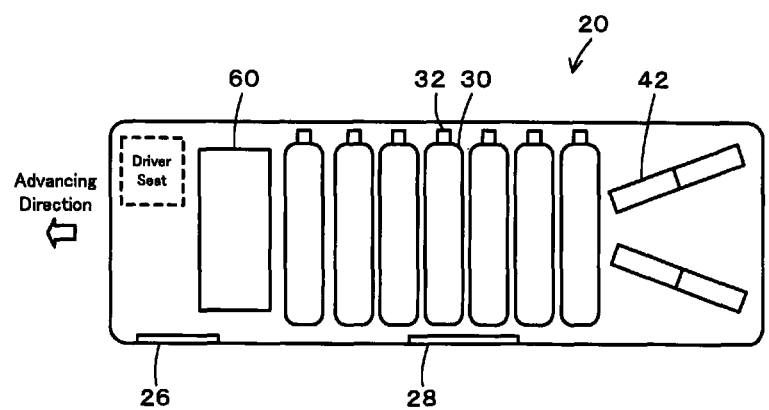
FIG. 4 illustrates placement of the hydrogen tank 30 on the roof 22 of the fuel cell equipped bus 20.

FIG. 1 is a schematic block diagram of a configuration of a fuel cell equipped bus 20 according to an embodiment of the present invention, FIG. 2 illustrates a state in which a hydrogen tank 30 is mounted on a roof 22 of the fuel cell equipped bus 20 of the embodiment. FIG. 3 illustrates a state in which fuel cells 40a and 40b and the hydrogen tank 30 are mounted in a rear portion and on the roof 22, respectively, of the fuel cell equipped bus 20, and FIG. 4 illustrates placement of the hydrogen tank 30 on the roof 22 of the fuel cell equipped bus 20. As shown, the fuel cell equipped bus 20 of the embodiment is configured as a large bus including a driver seat in a right front portion for passage on the left side, and a front platform 26 provided in a left side surface near the driver seat and a middle platform 28 provided in a left side surface in the middle, through which passengers are loaded into and unloaded from a passenger compartment 24. The fuel cells 40a and 40b are mounted in a lower portion of the rearmost portion of the fuel cell equipped bus 20, and seven hydrogen tanks 30 that store hydrogen as fuel to be supplied to the fuel cells 40a and 40b are mounted on the roof 22. On the roof 22 of the fuel cell equipped bus 20, besides the seven hydrogen tanks 30, an air conditioning unit 60 is mounted on the front of the hydrogen tank 30, and a plurality of radiators 42 that cool the fuel cells 40a and 40b are mounted on the rear thereof, and these components are covered with a roof cover 50 having a plurality of ventilating openings 52 in a ceiling portion.

A valve unit 32 is mounted to one end in a longitudinal direction of the hydrogen tank 30. In the valve unit 32, a pressure regulating valve that regulates pressure of hydrogen to be supplied to the fuel cells 40a and 40b and a fusible plug valve as a safety valve are incorporated, the fusible plug being fused at high temperature (for example, 110° C. or higher) to discharge hydrogen in the tank to the outside. The hydrogen tank 30 is mounted on the roof 22 by belts 39 so that the valve unit 32 is placed on the right side of the fuel cell equipped bus 20 and the longitudinal direction of the hydrogen tank 30 is in a lateral direction of the vehicle. Specifically, the hydrogen tank 30 is mounted so that the valve unit 32 is separated as far apart as possible from the front platform 26 and the middle platform 28 and so that even a valve unit 32 of a hydrogen tank 30 nearest to the middle platform 28 is separated at least by a substantial vehicle width or more as shown in FIG. 4. The valve unit 32 is separated from the front platform 26 and the middle platform 28 so that even if hydrogen leaks from the valve unit 32 or the fusible plug valve of the valve unit 32 is fused to discharge hydrogen from the tank, the influence of the leaking or discharged hydrogen on the front platform 26 and the middle platform 28 can be reduced.

The plurality of ventilating openings 52 of the roof cover 50 are formed by a plurality of elongated plate materials overlapping each other with angles and gaps so that the hydrogen tanks 30 are not exposed to direct sunlight at a predetermined angle (for example, 15° or 20°) or more and direct raindrops, and protect the hydrogen tanks 30 from ultraviolet rays and raindrops. The plurality of ventilating openings 52 of the roof cover 50 are formed to have a calculated opening area to release pressure inside the roof cover 50 when abnormally increased together with a gap 56 in a mounting lower portion 54 of the roof cover 50.

Figure 5:
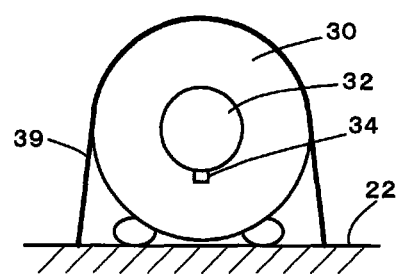
FIG. 5 illustrates a state of mounting of the hydrogen tank 30.

As shown in FIG. 5, a discharge port 34 for hydrogen of the fusible plug valve of the valve unit 32 is directed vertically downward so that discharged hydrogen is applied to the roof 22 of the fuel cell equipped bus 20 and diffused. Thus, if the fusible plug valve is fused to discharge hydrogen in an emergency, the discharged hydrogen is applied to the roof 22 and diffused, and released upward through the ventilating opening 52 of the roof cover 50. Thus, the discharge port 34 for hydrogen is directed vertically downward so that the discharged hydrogen is applied to the roof 22 of the fuel cell equipped bus 20, thereby allowing the discharged hydrogen to be diffused and effectively diluted.

According to the fuel cell equipped bus 20 of the embodiment described above, the hydrogen tank 30 is mounted on the roof 22 so that the valve unit 32 mounted to one end in the longitudinal direction of the hydrogen tank 30 is separated as far apart as possible from the front platform 26 and the middle platform 28 and so that the longitudinal direction of the hydrogen tank 30 is in the lateral direction of the vehicle. Thus, even if hydrogen leaks from the valve unit 32 or the fusible plug valve of the valve unit 32 is fused to discharge hydrogen from the tank, the influence of the leaking or discharged hydrogen on the front platform 26 and the middle platform 28 can be reduced. Further, the hydrogen tank 30 is mounted so that the discharge port 34 for hydrogen of the fusible plug valve of the valve unit 32 is directed vertically downward. Thus, if the fusible plug valve is fused to discharge hydrogen, the discharged hydrogen can be applied to the roof 22 of the fuel cell equipped bus 20 and diffused and thus can be diluted. Thus, when the fusible plug valve is fused to discharge hydrogen, the influence of the discharged hydrogen on the front platform 26 and the middle platform 28 can be reduced.

The fuel cell equipped bus 20 of the embodiment is configured as a bus for passage on the left side, but may be configured as a bus for passage on the right side. In this case, it is only necessary that a driver seat, a front platform 26 and a middle platform 28 are provided on the right side, and a hydrogen tank 30 is mounted on a roof 22 so that a valve unit 32 mounted to one end in a longitudinal direction of the hydrogen tank 30 is placed on the left side and so that the longitudinal direction of the hydrogen tank 30 is in a lateral direction of a vehicle.

In the fuel cell equipped bus 20 of the embodiment, the hydrogen tank 30 is mounted on the roof 22. However, it is only necessary that the hydrogen tank 30 is mounted so that the valve unit 32 is separated as far apart as possible from the front platform 26 and the middle platform 28. Thus, the hydrogen tank 30 may be mounted to any position such as below a passenger compartment, not limited to on the roof 22.

In the fuel cell equipped bus 20 of the embodiment, the hydrogen tank 30 is mounted on the roof 22 so that the longitudinal direction thereof is in the lateral direction of the vehicle. However, it is only necessary that the hydrogen tank 30 is mounted so that the valve unit 32 is separated as far apart as possible from the front platform 26 and the middle platform 28. Thus, the hydrogen tank 30 may be mounted so that the longitudinal direction thereof is in a direction different from the lateral direction of the vehicle.

In the fuel cell equipped bus 20 of the embodiment, the valve unit 32 is mounted to one end in the longitudinal direction of the hydrogen tank 30. However, it is only necessary that the hydrogen tank 30 is mounted so that the valve unit 32 is separated as far apart as possible from the front platform 26 and the middle platform 28. Thus, the valve unit 32 may be mounted to any part of the hydrogen tank 30.

In the fuel cell equipped bus 20 of the embodiment, the hydrogen tank 30 is mounted so that the discharge port 34 for hydrogen of the fusible plug valve of the valve unit 32 of the hydrogen tank 30 is directed vertically downward. However, it is only necessary that the discharged hydrogen can be diluted, thus the discharge port 34 may be directed downward from a horizontal position, not limited to vertically downward. It is only necessary that the discharged hydrogen can be diffused, thus the discharge port 34 may be directed so that the discharged hydrogen is applied to the roof cover 50.

In the embodiment, the description is made on a method of mounting the hydrogen tank 30 as a gas fuel tank to the fuel cell equipped bus 20, but the present invention may be applied to a method of mounting a gas fuel tank that stores gas fuel other than hydrogen such as natural gas to a vehicle.

The gas fuel tank generally has a cylindrical structure, and a valve structure as a port opening for gas is placed at one end in a longitudinal direction of the gas fuel tank. In the embodiment, the tank is mounted so that the longitudinal direction thereof is in the lateral direction of the vehicle and so that the end having the valve structure is separated from the platform of the occupant compartment of the vehicle. In other words, the tank is mounted so that the other end thereof having no valve structure is placed on the side of the platform of the occupant compartment.

In the embodiment, the tank is mounted so that the valve structure thereof is separated from the platform of the occupant compartment of the vehicle, but the tank may be mounted so that the valve structure thereof is separated from a sidewalk on a road on which the vehicle travels. In this case, for example, when there is a sidewalk (a side strip) for pedestrians on a side portion of a road with one or more lanes on each side, it may be allowed that the end having the valve structure of the tank is placed on the side of a centerline (center) of the road, and the end having no valve structure of the tank is placed on the side of the sidewalk. This can reduce the influence on pedestrians.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The present invention is applicable in the industry producing vehicles to which a gas fuel tank is mounted.

The invention claimed is:

1. A vehicle to which a gas fuel tank that stores gas fuel is mounted,
    wherein the gas fuel tank is mounted on a roof,
    wherein said gas fuel tank is mounted so that a longitudinal direction thereof is in a lateral direction of the vehicle and so that a valve structure mounted to said gas fuel tank is placed on a counter side of a platform of an occupant compartment which is set only on one side of said vehicle to be separated from said platform,
    wherein said valve structure includes a safety valve having a port opening that discharges gas fuel through said port opening substantially perpendicularly to the longitudinal direction of the said gas fuel tank,
    wherein said gas fuel tank is mounted to said vehicle so that a discharge direction of the gas fuel from said port opening of said safety valve is directed downward from a horizontal position,
    wherein said gas fuel tank is mounted to the vehicle so that the gas fuel discharged from the safety valve is applied to the roof,
    wherein a cover that covers the gas fuel tank from above has a plurality of ventilating openings to ventilate the gas fuel discharged from the safety valve,
    wherein the plurality of ventilating openings are formed above the gas fuel tank,
    wherein the plurality of ventilating openings open upwardly along the lateral direction of the vehicle directly to the outside but stop before exposing the valve structure in order for the valve structure to remain covered,
    wherein said plurality of ventilating openings are designed so as to reduce pressure inside said cover when said pressure inside said cover is suddenly increased.

2. A vehicle according to claim 1, wherein said gas fuel tank is mounted so that said valve structure is separated from said platform by a substantial vehicle width or more.

3. A vehicle according to claim 1, wherein the gas fuel tank having said valve structure mounted near a front end radial surface at one end in the longitudinal direction.

4. A vehicle according to claim 1, wherein said gas fuel tank is mounted to said vehicle so that the gas fuel discharged from the said safety valve is diffused by a body of said vehicle.

5. A vehicle according to claim 1, wherein said vehicle is a bus.

6. A vehicle according to claim 1, wherein said gas fuel tank is a hydrogen tank.

7. A method of mounting a gas fuel tank that stores gas fuel to a vehicle,
    mounting said gas fuel tank on a roof of a vehicle so that a longitudinal direction thereof is in a lateral direction of the vehicle and so that a valve structure mounted to said gas fuel tank includes a port opening for gas fuel of said gas fuel tank, wherein the valve structure is placed on a counter side of a platform of an occupant compartment which is set only on one side of said vehicle to be separated from said platform, wherein said gas fuel tank is mounted to the vehicle so that the gas fuel is discharged from the port opening, in a downward direction from a horizontal position and applied to the roof, and
    covering the gas fuel tank from above with a cover that has a plurality of ventilating openings to ventilate the gas fuel discharged from the port opening,
    wherein the plurality of ventilating openings are formed above the gas fuel tank, and
    wherein the plurality of ventilating openings open upwardly along the lateral direction of the vehicle directly to the outside but stop before exposing the valve structure in order for the valve structure to remain covered.

8. A method of mounting a gas fuel tank according to claim 7, wherein said gas fuel tank is a hydrogen tank.

* * * * *